(12) United States Patent
Lush

(10) Patent No.: US 6,604,487 B2
(45) Date of Patent: Aug. 12, 2003

(54) SQUIRREL REPELLING HANGER FOR A BIRD FEEDER OR THE LIKE

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 0 days.

(21) Appl. No.: 09/957,402

(22) Filed: Sep. 20, 2001

(65) Prior Publication Data

US 2003/0075112 A1 Apr. 24, 2003

(51) Int. Cl.[7] ............................................. A01K 39/00
(52) U.S. Cl. ..................................................... 119/57.9
(58) Field of Search .............................. 119/57.9, 52.3, 119/63

(56) References Cited

U.S. PATENT DOCUMENTS

| | | | |
|---|---|---|---|
| 2,856,898 A | * 10/1958 | Doubleday et al. | ........ 119/57.9 |
| 4,541,362 A | 9/1985 | Dehls | |
| 5,048,461 A | 9/1991 | Wessner | |
| 5,105,765 A | 4/1992 | Loken | |
| 5,297,503 A | 3/1994 | Hibbard | |
| 5,392,732 A | 2/1995 | Fry | |
| 5,471,951 A | 12/1995 | Collins | |
| 5,690,056 A | 11/1997 | Korb | |
| 5,720,238 A | 2/1998 | Drakos | |
| 6,119,627 A | 9/2000 | Banyas et al. | |
| 6,230,440 B1 | * 5/2001 | Deutsch | ......................... 47/67 |
| 6,341,576 B1 | * 1/2002 | Cathell et al. | ............. 119/52.3 |
| 6,408,789 B1 | * 6/2002 | Hsiao | ........................ 119/57.9 |

* cited by examiner

Primary Examiner—Charles T. Jordan
Assistant Examiner—Susan C. Alimenti
(74) Attorney, Agent, or Firm—Thomte, Mazour & Niebergall; Dennis L. Thomte

(57) ABSTRACT

A rodent repelling bird feeder having an elongated vertical hanging support, a motor and a rotatable dish coupled to the motor. The motor is reciprocatively mounted in a motor sleeve so when a rodent of excessive weight alights upon the dish the motor is pushed against a resistive spring and a switch is closed, thereby engaging the motor which rotates the dish to dislodge the rodent therefrom.

27 Claims, 3 Drawing Sheets

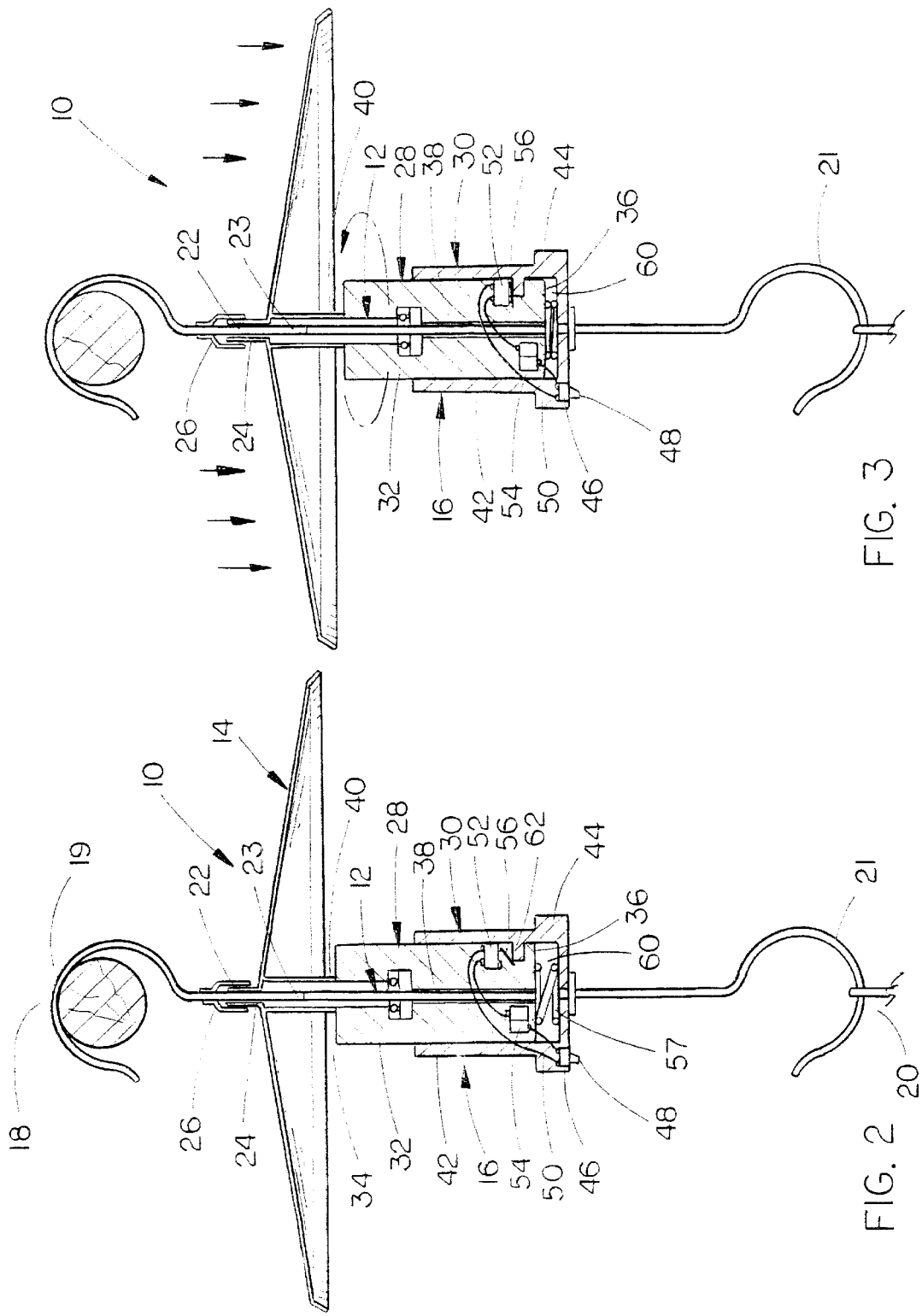

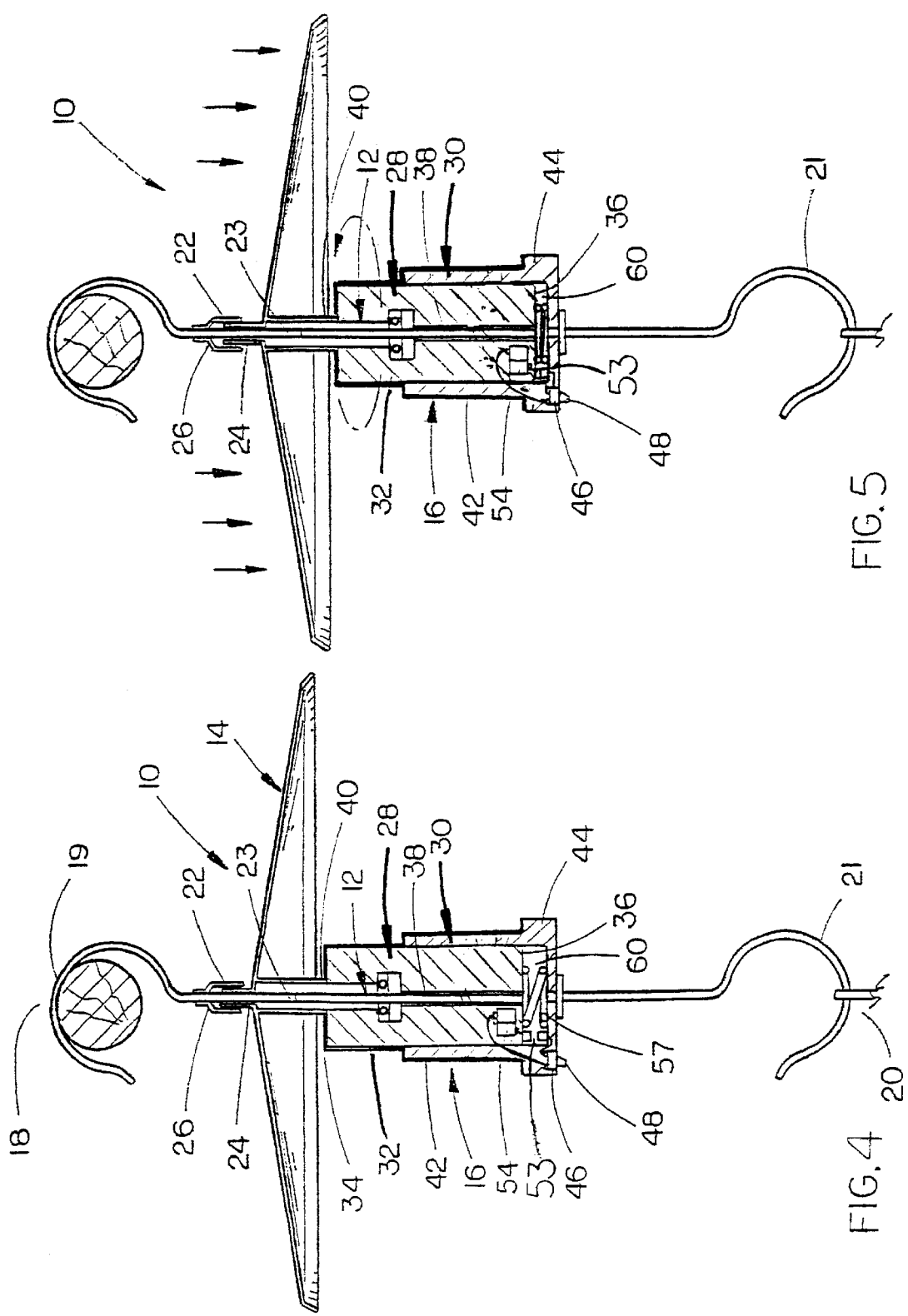

US 6,604,487 B2

SQUIRREL REPELLING HANGER FOR A BIRD FEEDER OR THE LIKE

BACKGROUND OF THE INVENTION

1. Field of the Invention

This invention relates to a squirrel repelling hanger for a bird feeder or the like and more particularly to a rodent repelling hanger for a bird feeder which prevents squirrels from feeding from the bird feeder.

2. Description of the Related Art

Several types of bird feeders have been designed for preventing unwanted animals such as squirrels from eating the bird food in the feeder. Little prior art exists on rodent repelling hangers where various types of plants, feeders and bird shelters may be hung therefrom. One type of bird feeder has weight-sensitive tiltable perches thereon so when a squirrel or large bird lands on the perch, the perch moves and dislodges the animal. This type of bird feeder is shown in Loken U.S. Pat. No. 5,105,765; Wessner U.S. Pat. No. 5,048,461; and Dehls U.S. Pat. No. 4,541,362.

Another type of device uses a shocking system to send an electric impulse into the unwanted animal when that animal attempts to eat from the feeder. This type of device is shown in Fry U.S. Pat. No. 5,392,732 and Collins U.S. Pat. No. 5,471,951.

Still another type of repelling device uses weight-sensitive devices to discourage the unwanted animal from feeding from the feeder. This device shuts off the food supply when a heavy animal or bird lands upon the perch. This type of device is taught in Drakos U.S. Pat. No. 5,720,238.

Yet another type of repelling device to which the present invention pertains senses the excessive weight of a squirrel or unwanted bird and removes the unwanted animal at a predetermined point in time. This type of device is taught in Hibbard U.S. Pat. No. 5,297,503; Korb U.S. Pat. No. 5,690,056; and Banyas U.S. Pat. No. 6,119,627.

SUMMARY OF THE INVENTION

A squirrel repelling hanger for a bird feeder or the like for repelling unwanted animals such as squirrels is disclosed. The hanger assembly of the present invention is attached to a tree, deck or the like. The hanger assembly comprises an elongated rod, a repelling dish and a motor enclosure having a gearing mechanism which will rotate the repelling dish at such a time as an unwanted animal alights upon the dish.

This invention has a calibrated resistance spring affixed between the motor sleeve and the motor housing so that if the unwanted animal alights on the dish, the dish will move so that a contact operates a switch to cause the motor and gearing mechanism to rotate the dish, with the centrifugal force generated by the rotation of the dish being sufficient to throw the animal from the dish, much to the amusement of all watching.

It is therefore a principal object of the invention to provide a repelling hanger assembly so feeders, plants, etc., may be hung without being accessible to unwanted animals such as squirrels or the like.

Yet another object of the invention is to provide a squirrel repelling bird feeder.

Still another object of this invention is to provide an inexpensive practical means of protecting bird feeders from unwanted animals such as squirrels.

Yet another object of this invention is to provide a rodent repelling bird feeder that is functional in various weather conditions.

These and other objects will be obvious to those skilled in the art.

BRIEF DESCRIPTION OF THE DRAWINGS

FIG. 2 is a partial vertical elevational view of the operable parts of the invention partially in section showing the switch in an off position;

FIG. 3 is a partial vertical elevational view of the operable parts of the invention partially in section showing the switch in a closed on position indicating that the dish is rotating;

FIG. 4 is a partial vertical elevational view of the operable parts of the invention partially in section showing the electric contacts in an open off position; and FIG. 5 is a partial vertical elevational view of the operable parts of the invention partially in section showing the electric contacts in a closed on position indicating that the dish is rotating.

DESCRIPTION OF THE PREFERRED EMBODIMENT

Figure 1:
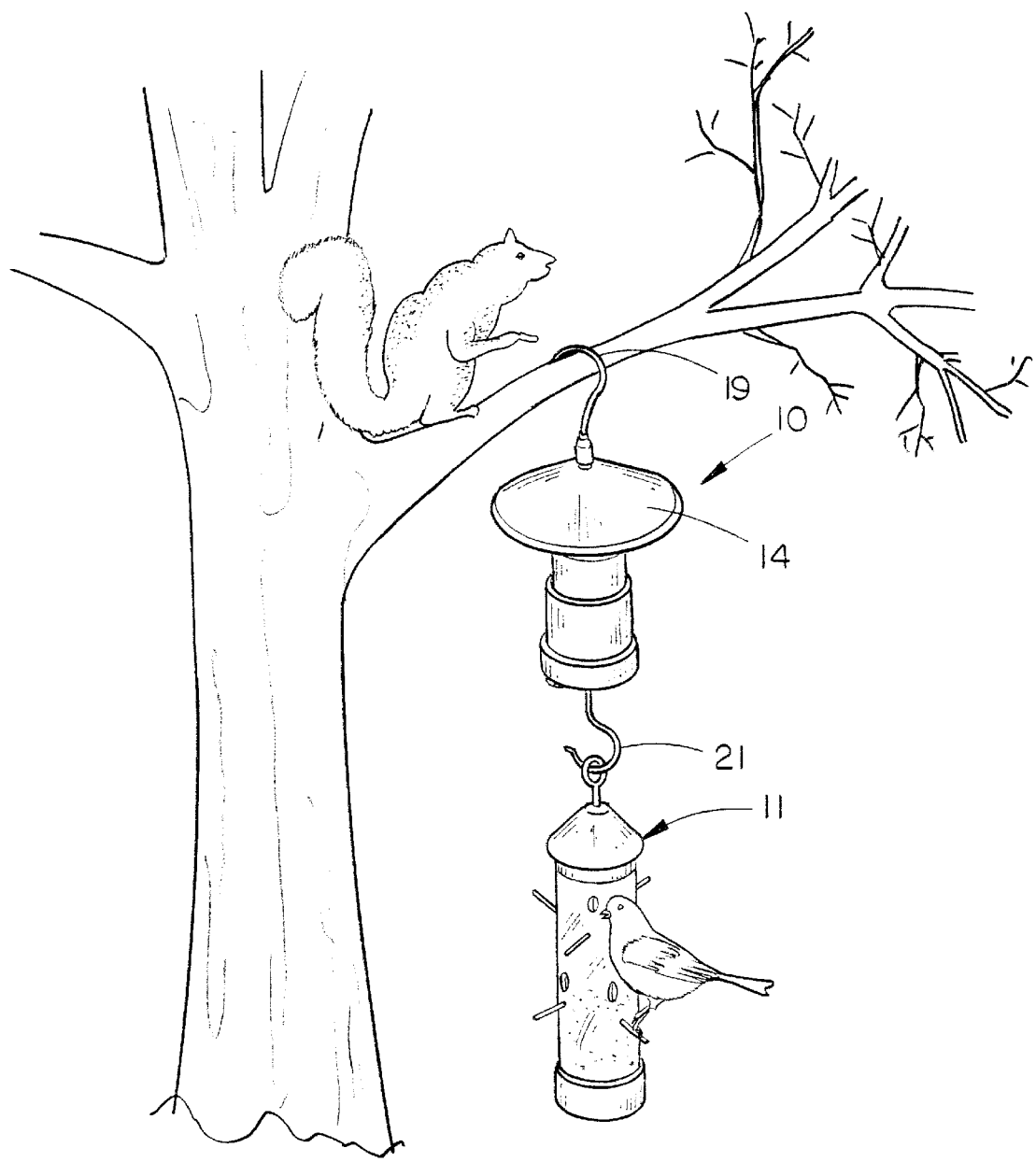
FIG. 1 is a perspective view of the present invention.

The squirrel repelling hanger assembly for a bird feeder of this invention is referred to generally by the reference numeral 10 for supporting the bird feeder II having food therein. The hanger assembly 10 generally comprises an elongated vertical rod 12, a repelling dish 14 and a motor enclosure 16. The vertical rod 12 has upper and lower ends 18 and 20, respectively. The upper end 18 of the rod 12 has a hook means 19 for supporting the bird feeder 11, on a tree, deck or the like. The hook means could be replaced by a strap, or any other supporting means known in the art. Similarly, lower end 20 has a supporting means in the form of a hook 21 for supporting the bird feeder 11. The rod 12 has a screw, snap or other common connection 23 for dissembling the rod 12 to facilitate the removal of the motor enclosure 16 and the dish 14. It should be noted that the connection 23 may be located anywhere on the rod 12 as long as the motor and dish may be removed.

The dish 14 is positioned above the motor enclosure 16 and has an opening 22 located in the center thereof which allows the rod 12 to pass therethrough without being in contact therewith. The dish 14 slopes downwardly from the opening 22 to its periphery to allow water to run off the dish and away from the opening 22. The dish 14 may be solid or have air passageways formed therein to minimize the bird feeder's movement from the wind. Preferably, the dish 14 is transparent. A tube 24 projects upwardly from opening 22 and embraces the rod 12. Rod 12 has a weather guard 26 extending outwardly and downwardly over the tube 24, thereby protecting the opening 22 from the weather.

The main operative portion of the invention resides in the motor enclosure 16. The motor enclosure 16 comprises a motor housing 28, a motor sleeve 30 and a protective cover 32. The motor housing 28 has an upper end 34, a lower end 36 and an elongated bore 38 extending from upper end 34 to the lower end 36 of the motor housing 28. The rod 12 extends through elongated bore 38 for reciprocative movement therewith. The motor housing 28 is operably connected to a hollow drive shaft 40 which is positioned around rod 12 and which is coupled to dish 14 for rotating the same. The motor housing 28 is telescopically engaged in the motor sleeve 30, as seen in the drawings, and which comprises a side wall 42 and a base 44. The rod 12 passes through the center of the base 44 and is rigidly connected thereto. The protective cover 32, which allows reciprocation between the motor housing 28 and the motor sleeve 30, is positioned over the housing 28 and sleeve 30 for protection from the weather. Within the motor housing 28 is a battery compartment for housing one or more suitable dry cell batteries which will drive a suitable D.C. electric motor turning a gear reduction unit. In another embodiment, the batteries may also be housed in the motor sleeve to maximize the space available in the motor housing. Furthermore, the motor need not be electrically driven. The motor may be driven by a wind-up spring driven motor or the like. The motor and gear reduction unit are not specifically detailed in the drawing, inasmuch as these types of units are quite common in the electrical and mechanical arts and it is believed that the same need not be specifically described. The motor and gear reduction units would be housed together proximal the upper end 34 of the motor housing 28, all of which is in the same motor enclosure 16.

At the bottom of the motor sleeve 30, there is a user-activated control on-off switch 46 comprising a contact switch button 48 which enables the user to turn the performance features of the hanger 10 on and off at will. The switch 46 is wired through suitable wiring 50 to a lever activated motor switch 52 which will energize the motor through suitable contacts 54 which will couple the motor and the batteries for energization. Similarly, if a wind-up spring motor is used the switch will be coupled to the wind-up spring motor for mechanically energizing the motor. The switch lever 56 is common in electrical and mechanical industries and may be purchased to have various operating resistance to fully activate the switch 52. Even though the switch 52 is depicted in the motor housing, the switch may also be attached to the bottom of the lower end 36 of the motor housing. Furthermore, if the motor is electrically powered, electric contacts may be attached to the bottom of the lower end 36 and the upper surface of the base 44 to close and open the electric circuit.

At the bottom of the motor sleeve 30, there is a user-activated control on-off switch 46 comprising a contact switch button 48 which enables the user to turn the performance features of the hanger 10 on and off at will. The switch 46 is wired through suitable wiring 50 to a lever activated motor switch 52 which will energize the motor through suitable contacts 54 which will couple the motor and the batteries for energization. Similarly, if a wind-up spring motor is used the switch will be coupled to the wind-up spring motor for mechanically energizing the motor. The switch lever 56 is common in electrical and mechanical industries and may be purchased to have various operating resistance to fully activate the switch 52. Even though the switch 52 is depicted in the motor housing, the switch may also be attached to the bottom of the lower end 36 of the motor housing. Furthermore, if the motor is electrically powered, electric contacts 53 may be attached to the bottom of the lower end 36 and the upper surface of the base 44 to close and open the electric circuit.

In operation of the present invention, when a squirrel or the like alights upon the dish 14, the weight of the squirrel thereon will cause the weight of the squirrel to be transferred to the dish 14 and the dish transfers the weight to the hollow drive shaft 40 which is vertically supported in the motor housing 28. Since the weight of the squirrel is greater than the resistance of the spring, the motor housing moves downward with respect to the motor sleeve 30 thereby closing the switch 52 or the contacts previously described and energizing the motor which will rotate the hollow shaft 40 which is coupled to the dish 14 and causes the squirrel to be dislodged and propelled from the dish 14. Once the squirrel has been dislodged from the dish 14, the weight is reduced thereupon causing the resistance spring 57 to push the motor housing 28 back into the rest position which will open the circuit and de-energize the motor.

Thus it can be seen that the invention accomplishes at least all of its stated objectives.

I claim:

1. A squirrel repelling hanger assembly for a bird feeder comprising:

an elongated rod having upper and lower ends, said upper end of said rod having a support means thereon, said lower end of said rod having a support means for supporting a bird feeder;

a motor sleeve having a base and side walls projecting perpendicular from said base, said elongated rod being secured to the center of said base of said motor sleeve;

a motor having first and second ends, a hollow output shaft and housing, said motor having an elongated opening extending from said first end to said second end of said motor;

said motor being mounted in said motor sleeve for movement therewith;

said elongated rod extending through said hollow output shaft and said elongated opening of said motor;

a resisting biasing means supporting said motor on said base of said motor sleeve;

a power supply powering said motor;

a repelling dish positioned above said motor and having an opening in said dish enabling said elongated rod to pass therethrough;

said dish having a coupling means coupling said dish to said motor output shaft; and a switch means for energizing said motor at predetermined times when the weight of an undesirable animal upon said dish overcomes the resistance of said biasing means causing said motor output shaft to move reciprocatively with respect to said rod causing said motor to move reciprocatively with respect to said motor sleeve and said rod and compress said resisting biasing means to thereby rotate said hollow output shaft and said coupled dish.

2. The structure of claim 1 wherein said motor sleeve has a switch contact extending inwardly from said motor sleeve.

3. The structure of claim 2 wherein said motor comprises an elongated opening enabling said switch contact to communicate with said motor and energize said switch.

4. The structure of claim 3 wherein said switch means has a moveable lever arm being mounted to receive said switch contact, said switch means energizing said motor when said switch contact moves said lever arm a predetermined distance.

5. The structure of claim 4 wherein said switch contact resists rotation of said motor.

6. The structure of claim 1 wherein said sleeve base has a contact on the upper surface thereof and said motor has a contact on the lower surface thereof, said contacts making connection and energizing said motor when the weight of the squirrel overcomes said resisting biasing means and compresses said biasing means.

7. The structure of claim 1 wherein said base of said motor sleeve has a cavity into which the resisting biasing means is maintained.

8. The structure of claim 7 wherein said resisting biasing means is a spring.

9. The structure of claim 1 wherein said dish has openings to allow air to pass therethrough.

10. The structure of claim 1, comprising a control switch connected in-line between the powered supply and the switch means.

11. The structure of claim 1 wherein said motor is electrically powered.

12. The structure of claim 11 wherein said sleeve base has an electric contact on the upper surface thereof and said motor has an electric contact on the lower surface thereof, said contacts making electrical connection and energizing said motor when the weight of the squirrel overcomes the resisting biasing means and compresses the same.

13. The structure of claim 1 wherein said first and second support means are hooks.

14. The structure of claim 1 wherein said first and second support means are straps.

15. The structure of claim 1 wherein said elongated rod has a means for disassembly.

16. A rodent repelling bird feeder, comprising:

an elongated rod having first and second ends, said first end of said rod having a support means thereon, said second end of said rod having a support means for supporting the food container of the bird feeder;

a motor sleeve having a base and side walls projecting perpendicular from said base, said elongated rod secured to the center of said base of said motor sleeve;

a motor having first and second ends, a hollow output shaft and housing, said motor having an elongated opening extending from said first end to said second end of said motor;

said motor being mounted in said motor sleeve for reciprocative movement therewith;

said elongated rod being positioned through said hollow output shaft and said elongated opening of said motor for reciprocative movement therewith;

said base of said motor sleeve having a cavity into which a spring is mounted;

said spring supporting said motor on said base of said motor sleeve;

said motor and said sleeve having a cover for protecting said motor and sleeve from the weather;

a power supply powering said motor;

a repelling dish positioned above said motor;

said dish having an opening in the center of said dish enabling said elongated rod to pass therethrough; said opening being protected from the weather by a guard secured to said rod and extending outwardly and downwardly over said rod opening;

said dish having a coupling means coupling said dish to said motor output shaft;

a switch means for energizing said motor at predetermined times when the weight of an undesirable animal upon said dish overcomes the resistance of said biasing means causing said motor output shaft to reciprocate with said rod causing said motor to reciprocate with said motor sleeve and said rod and compress said resisting biasing means to thereby rotate said hollow output shaft and said coupled dish, and a control switch connected in-line between the power supply and the switch means.

17. The bird feeder of claim 16 wherein said motor sleeve has a switch contact extending inwardly from said motor sleeve.

18. The bird feeder of claim 17 wherein said motor comprises an elongated opening enabling said switch contact to communicate with said motor and energize said switch.

19. The bird feeder of claim 18 wherein said switch means has a moveable lever arm being mounted to receive said switch contact, said switch means energizing said motor when said switch contact moves said lever arm a predetermined distance.

20. The bird feeder of claim 19 wherein said switch contact resists rotation of said motor.

21. The bird feeder of claim 18 wherein said sleeve base has a contact on the upper surface thereof and said motor has a contact on the lower surface thereof, said contacts making connection and energizing said motor when the weight of the undesirable animal overcomes the resisting biasing means and compresses the same.

22. The bird feeder of claim 16 wherein said motor is electrically powered.

23. The bird feeder of claim 16 wherein said sleeve base has an electric contact on the upper surface thereof and said motor has an electric contact on the lower surface thereof, said contacts making electrical connection and energizing said motor when the weight of the undesirable animal overcomes the resisting biasing means and compresses the same.

24. The bird feeder of claim 16 wherein said motor is powered by a wind-up spring.

25. The bird feeder of claim 16 wherein said first and second support means are hooks.

26. The bird feeder of claim 16 wherein said first and second support means are straps.

27. A bird feeder, comprising:

a food container for holding bird feed;

a hanger system operatively connected to the upper end of said food container for suspending the food container from a support;

said hanger system including a dish positioned above said food container;

said hanger system including means for rotating said dish when an animal of a predetermined weight moves thereon so that the rotating dish will dislodge the animal from the dish.

* * * * *